United States Patent [19]

Sullivan et al.

[11] 4,319,541
[45] Mar. 16, 1982

[54] NAVIGATIONAL AID

[76] Inventors: George Sullivan, 336 Augusta Ave., DeKalb, Ill. 60115; James Nies, 422 Logan, Geneva, Ill. 60134

[21] Appl. No.: 144,310

[22] Filed: Apr. 28, 1980

[51] Int. Cl.³ .......................... G01S 5/08; G09F 9/00
[52] U.S. Cl. ............................... 116/318; 343/112 PT
[58] Field of Search ............... 116/309, 245, 246, 241, 116/318, 313, 314, 316; 235/89 R, 88 N; 343/112 PT

[56] References Cited

U.S. PATENT DOCUMENTS

| 1,643,290 | 9/1927 | Anderson | 116/255 X |
| 3,249,085 | 5/1966 | St. Jean | 116/318 |
| 3,347,204 | 10/1967 | Beall | 116/318 |
| 3,350,007 | 10/1967 | Urben | 235/88 N |
| 3,570,448 | 3/1971 | Gates | 116/309 X |
| 3,727,226 | 4/1973 | Bush | 343/112 PT |
| 3,778,832 | 12/1973 | Carruthers | 343/112 PT |
| 3,804,057 | 4/1974 | Toscan | 116/318 |
| 4,096,633 | 6/1978 | Nolan | 116/318 X |
| 4,194,111 | 3/1980 | Katz | 235/88 R X |

Primary Examiner—Daniel M. Yasich
Attorney, Agent, or Firm—LeBlanc, Nolan, Shur & Nies

[57] ABSTRACT

A navigational aid including a color coded display of all significant information regarding the location and operation of sequenced radio beacons within a selected geographical area and a disc type indicator for selectively revealing information regarding a particular beam while masking information relating to all other beams.

1 Claim, 4 Drawing Figures

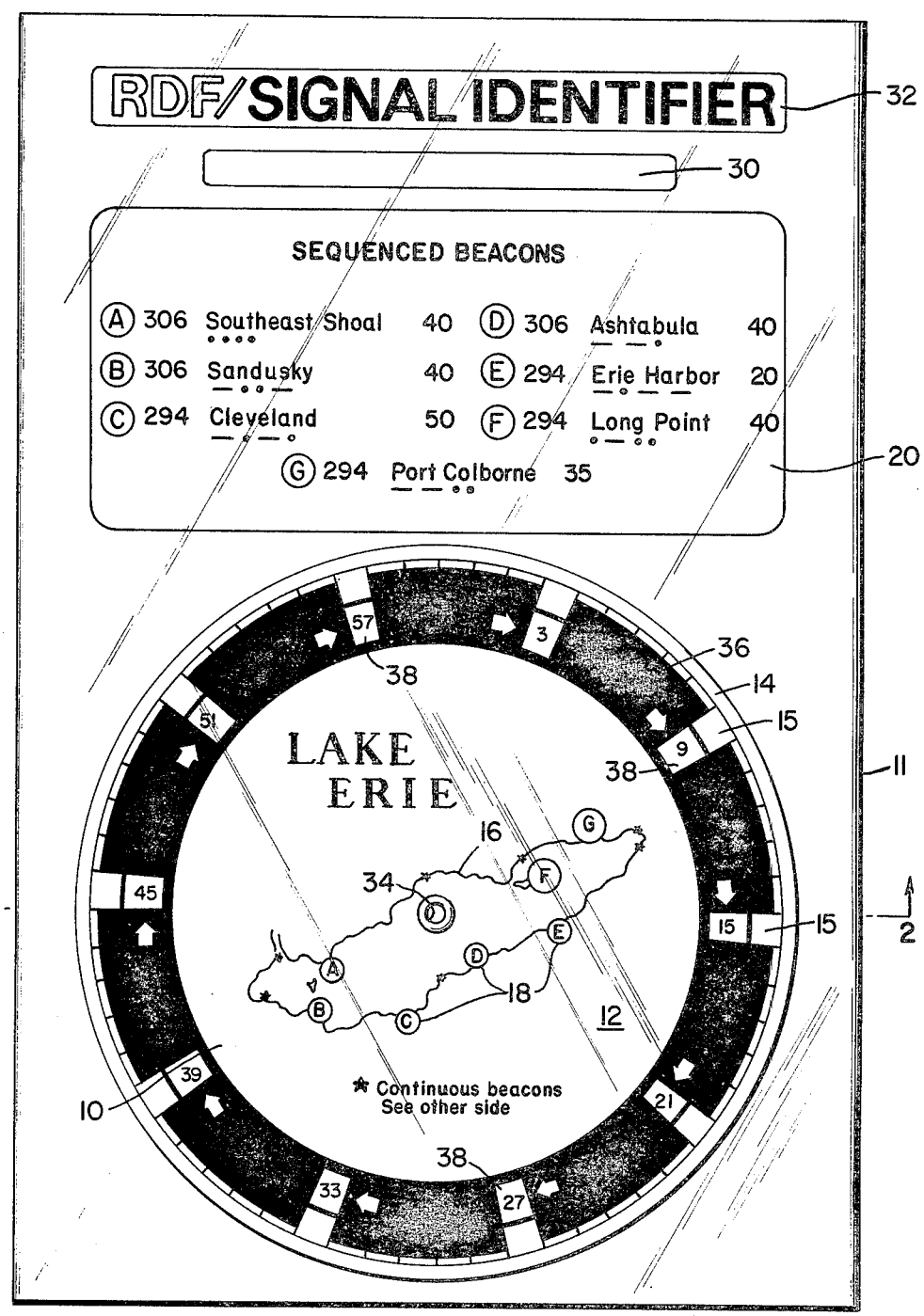
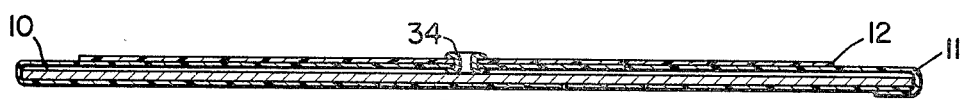

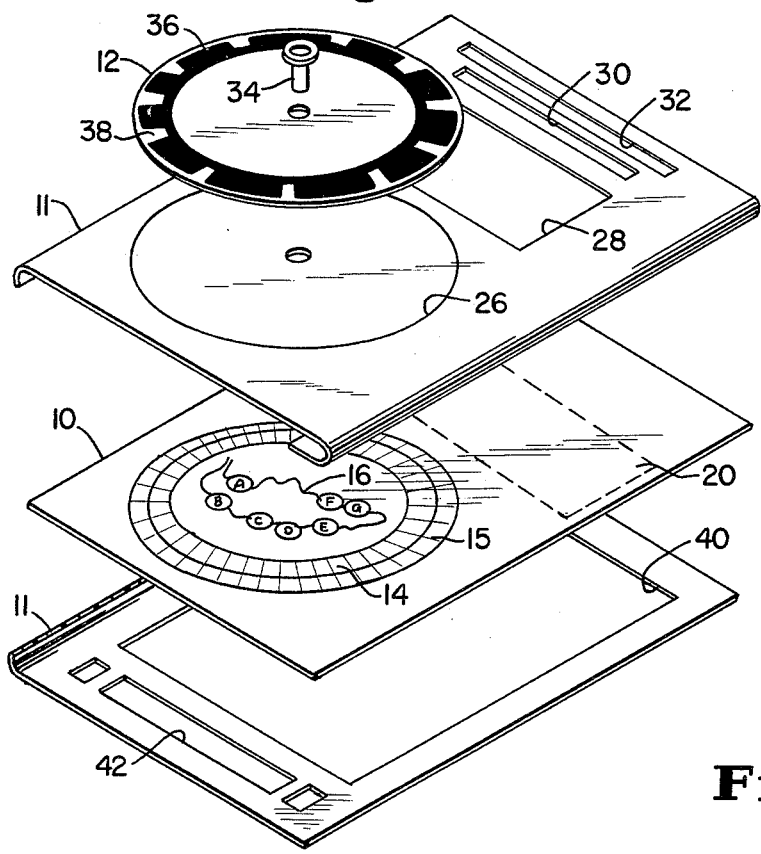
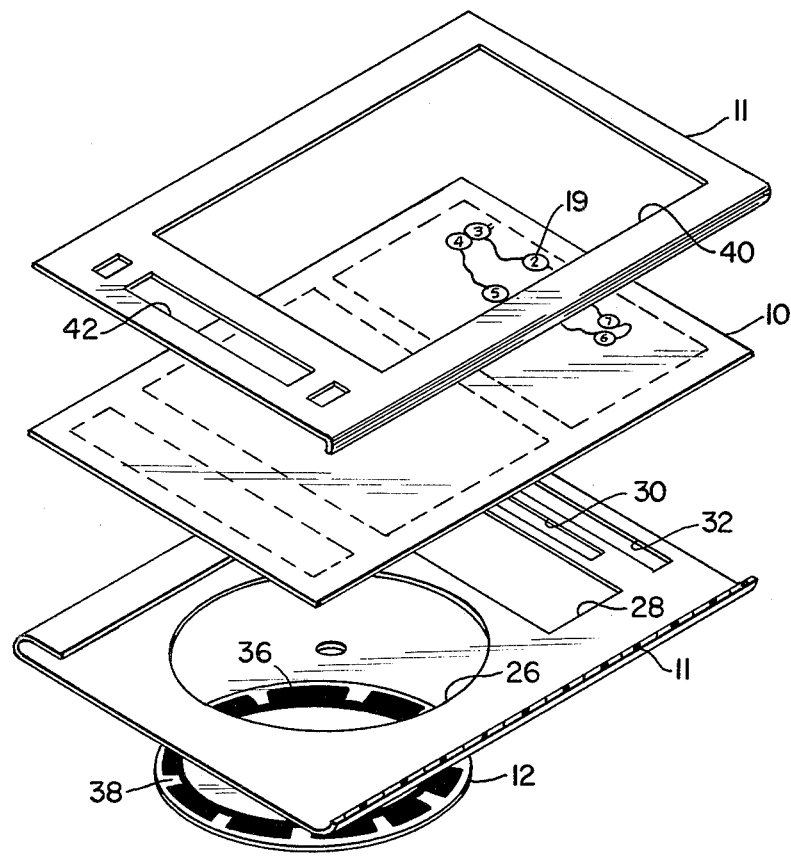

NAVIGATIONAL AID

The present invention relates generally to navigational aids comprising a time sequencing and data correlating device for radio beacon transmissions received by radio direction finders and used to provide navigational bearings and fixes.

More particularly, the present invention is a disc type indicator and calculator for readily displaying the transmission times as well as the code, signal frequency, range, and approximate geographical position for all sequenced radio beacons within a selected geographical area as well as the code signal, frequency, range, and approximate geographical position for all continuous beacons within the same general area. Additionally the devices of the present invention provide navigationally significant data on selected standar A.M. broadcast stations.

Some of the information provided by the units of the present invention is available in the United States Coast Guard Light Lists. However, the information is not presented in a form which permits simple, fast and accurate determination of transmission times as well as a ready reference of related data needed by the radio navigator. The simplicity and speed of the operation of the device of the present invention is not avalable in any known prior device.

The navigational aid of the present invention is a disc type indicator or calculator formed of lightweight construction and of compact design that can readily be set to indicate the exact minutes of transmission within the sequence of any sequenced radio beacon within a geographical area. The indicator includes a color code system and a rotating mask wheel to identify the various transmission times. Each of the six possible transmission times within the sequence used by radio beacons is indicated by a distinct color, the colors being displayed in a sixty segment annular pattern and the colors repeating themselves in every sixth segment. The segments are numbered consecutively clockwise indicating minutes after the hour.

A rotating color mask wheel, overlaid on the color display, has ten transparent openings or windows spaced to correspond with every sixth segment of the color display. Elsewhere on the unit is a table of sequenced radio beacons, which, in addition to other data, assigns a color corresponding to a color in the annular display to each sequenced beacon within the geographical area covered by the particular unit.

By simple manipulation of the unit as described below, the user can substantially instantaneously determine all of the information required to establish his position using conventional radio direction finding (RDF) equipment.

The obverse side of the unit displays data on continuous radio beacons and may also include data for standard A.M. broadcast stations.

In a preferred form the invention employs a card like insert or slide of suitable rigid sheet material, which has specific marine navigational data recorded on both faces, and which is removably inserted in a case of vinyl or other plastic material.

The mask wheel is rotatably mounted on the case overlying the appropriate portion of the data card.

It is accordingly, a primary object of the present invention to provide a time sequencing and data correlating device, utilizing a relationship between a color sequence and a time sequence, which gives an immediate determination of the broadcast times of sequenced radio beacons.

Another object of the present invention is to provide a data correlating device for all other information necessary for taking RDF bearings of sequenced radio beacons.

Another object is to provide a data correlating device which, by means of the relationship between a color sequence and a time sequence, enables the radio navigator to determine which beacon he is receiving on his radio direction finding set.

Another object is to provide a data correlating device for all information necessary for taking an RDF bearing of continuous radio beacons.

Another object is to provide a data correlating device for all information necessary for taking an RDF bearing of selected A.M. stations.

Another object is to provide a data correlating device which can be used as a quick reference to the method of operation of sequenced and continuous radio beacons either while aboard a vessel navigating certain waters or for the purposes of study. Thus as a further object of the present invention, it is desired to provide a training aid for instructing individuals in the method of operation of radio beacons and in the principles of radio direction finding.

Other objects, advantages, and novel features of the invention will become apparent from the following detailed description of the invention when considered in conjunction with the accompanying drawings.

THE DRAWINGS

FIG. 1 is a front view of a typical embodiment of the device of the present invention;

FIG. 2 is a transverse section taken along line 2-2 of FIG. 1; and

FIGS. 3 and 4 are exploded views of the units, respectively, showing the front and obverse sides of the unit with portions of the casing being cut away.

DESCRIPTION OF PREFERRED EMBODIMENTS

Referring to the drawings, it will be seen that the present invention in one preferred embodiment takes the form of a data card 10, a case 11, and a rotating color mask wheel 12. The card 10 is made of plastic coated cardboard or similar material and is printed on both faces.

The front side is printed with a segmented annular color-coded timing sequence display area 14. This display consists of 60 discrete color segments 15 printed in 6 colors with the colors repeating themselves every sixth segment. Each segment has been assigned a number consecutively clockwise from 0-59 indicating minutes after the hour. Within the display area is an area mini chart 16. Positioned about the chart are color-coded alphabetic geographic indices 18 which indicate the approximate geographical position of sequenced radio beacons. Printed above display area 14 is a second display area 19 containing a sequenced beacon data table 20. This table lists all the sequenced beacons within the geographical area covered by the unit. It includes the color-coded alphabetic geographic indices corresponding to those indices 18 shown on mini chart 16, the frequency, beacon name, code signal, and the range for each beacon.

The case 11, while of one-piece construction, presents a face and a back, each side serving different purposes. Giving initial consideration to the face, it can be seen that four windows in its surface are provided to allow the viewing of information on the card 10 below, when the two are in register. Registration is accomplished when the top and bottom edges of the card 10 are flush with the top and bottom edges of the case.

The window 26 permits a view of the color coded timing sequence display area 14 and the display area 19 containing sequenced beacon area mini-chart 16. Window 28 permits the view of the sequenced beacon data table 20 and windows 30 and 32 permit a view of chart identification data and similar material.

Rotatably secured to the front side of the case 11 by means of a rivet 34 is a rotating color mask wheel 12 made of suitable plastic. The wheel has an opaque annular section 36 adjacent its outer periphery, the opaque section having ten windows or transparent sections 38 spaced equally about its circumference. The windows 38 permit the simultaneous viewing of ten segments of the color coded timing sequence display area 14. The windows 38 are opaque sections are so correlated with the segments 15 that when the wheel 12 is rotated to align any one of the windows 38 with a segment 15 of selected color, the nine remaining windows then reveal the same color.

Radially inward from each color segment a number is printed indicating minutes after any hour. Accordingly, when the mask wheel is rotated so that the windows 38 reveal a selected color they also reveal an associated set of numbers which are the radio beacon transmission times for the particular beacon having the associated color. All other colors and transmission times are masked out by the opaque portion 36 of the masking wheel.

The center of the masking wheel is preferably left clear to permit easy viewing of the information registered below it on the information slide 10. The outer diameter of the opaque portion 36 of the masking wheel is slightly smaller than the outer diameter of the display area 14 so that a strip of the latter is constantly visible. This aids in the instant recognition of the various segments along the disc which are masked out.

The backside of the device provides a convenient area for the display of additional navigational information for example the location, frequency, broadcast signal of continuous beacons within the area, and, optionally, data regarding A.M. broadcast stations. This information is viewable through windows 40 and 42 in the case 11.

The operation of the device of the present invention is very simple. Assume the user is navigating certain waters served by radio beacons and has a radio direction finder at his disposal and desires to take bearings of two beacons in order to obtain a fix. The present invention provides all of the information the user required regarding the beacons in a uniquely accessible and convenient manner.

In the operation of the device, the sequenced beacon area mini-chart 16 is examined to permit the selection of one beacon near the navigator's estimated position.

The user then rotates the masking wheel 12 to align the windows 38 with the color on the display area 14 corresponding to the color associated with the selected beacon as indicated by the data table 20. From this table the range of the desired beacon can also be determined. A beacon in range can be tuned in on the frequency which also appears in the data table.

By reference to the mask wheel 12 the nearest minute in a window 38 coming after the actual clock time can be determined. This determines the next transmission of the desired beacon which will transmit with the code signal listed in the table 20.

A cross bearing can be taken of some other beacons within range by repeating the process.

The process can be used in reverse. For example, if a beacon is received, its identity can be determined by dialing in the time in which it begins broadcasting and noting the color appearing in the windows 38. The received signal must originate from the nearest beacon listed in the table 20.

In all forms of the invention there is provided a lightweight relatively inexpensive convenient device for assisting the navigator in identifying radio beacons and in preparing to take beacon bearings with a radio direction finder.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A navigational aid for determining the frequency, code, and transmission time of a selected group of radio beacons which transmit at regular short intervals, comprising, a casing having at least two spaced apart transparent portions, a data card removably positioned within said casing having two similarly spaced apart data display areas, each of said display areas being visible through one of said transparent portions of said casing, one said data display area containing the names of said beacons, their broadcast frequencies and code and identifying each of said beacons with a distinct color symbol, the other said data display area being in annular form and having a plurality of radial segments, each of said radial segments displaying a color corresponding to the color of one of said beacons and a number indicating the broadcast time for said beacon, and a disc rotatably mounted on said casing and having an annular indicator section in overlying relation with said annular data display, said indicator section having opaque and transparent sections correlated with said annular data display area so that in any selected rotated position said transparent portions reveal all segments on said annular data display having a selected color while said opaque portions cover all other segments.

* * * * *